(12) United States Patent
Pehrson

(10) Patent No.: US 10,005,451 B2
(45) Date of Patent: Jun. 26, 2018

(54) CONTROL SYSTEM, SWITCH AND CONTROL METHOD FOR A HYBRID ELECTRIC VEHICLE

(71) Applicant: VOLVO CAR CORPORATION, Gothenburg (SE)

(72) Inventor: Hans Pehrson, Torslanda (SE)

(73) Assignee: Volvo Car Corporation, Gothenburg (SE)

(*) Notice: Subject to any disclaimer, the term of this patent is extended or adjusted under 35 U.S.C. 154(b) by 56 days.

(21) Appl. No.: 15/146,978

(22) Filed: May 5, 2016

(65) Prior Publication Data
US 2016/0325734 A1    Nov. 10, 2016

(30) Foreign Application Priority Data
May 5, 2015  (EP) .................................. 15166372

(51) Int. Cl.
*B60L 9/00*  (2006.01)
*B60L 11/00*  (2006.01)
(Continued)

(52) U.S. Cl.
CPC ............ *B60W 20/20* (2013.01); *B60K 6/442* (2013.01); *B60Q 1/503* (2013.01); *B60W 10/06* (2013.01);
(Continued)

(58) Field of Classification Search
CPC ... B60K 6/52; B60K 6/36; B60K 6/40; B60K 6/485; B60K 2006/266; B60K 7/0007;
(Continued)

(56) References Cited

U.S. PATENT DOCUMENTS

| 5,841,201 A * | 11/1998 | Tabata | B60K 6/365 |
| | | | 180/65.25 |
| 6,832,148 B1 * | 12/2004 | Bennett | B60K 6/445 |
| | | | 180/65.225 |

(Continued)

FOREIGN PATENT DOCUMENTS

| DE | 102009048680 | 6/2010 |
| DE | 102010003502 | 10/2011 |

(Continued)

OTHER PUBLICATIONS

Extended European Search Report for European Application No. EP 15166372.1, Completed by the European Patent Office, dated Nov. 18, 2015, 8 Pages.

*Primary Examiner* — Jelani A Smith
*Assistant Examiner* — Luis A Martinez Borrero
(74) *Attorney, Agent, or Firm* — Brooks Kushman P.C.

(57) ABSTRACT

A control system, a switch and a control method for a hybrid vehicle, the vehicle operable in a hybrid mode where a combustion engine and an electric motor can be used, and in an electric mode where only the electric motor can be used. The control system includes a propulsion mode control module configured to control the vehicle to operate in one of the hybrid mode and the electric mode. The propulsion mode control module is further configured to verify that the vehicle has been in an off-state for a predetermined period of time before switching from the hybrid mode to the electric mode.

15 Claims, 5 Drawing Sheets

(51) Int. Cl.
*G05D 1/00* (2006.01)
*G05D 3/00* (2006.01)
*G06F 7/00* (2006.01)
*G06F 17/00* (2006.01)
*B60W 20/20* (2016.01)
*B60W 50/08* (2012.01)
*B60Q 1/50* (2006.01)
*B60W 20/40* (2016.01)
*B60K 6/442* (2007.10)
*B60W 10/06* (2006.01)
*B60W 10/08* (2006.01)

(52) U.S. Cl.
CPC .......... *B60W 10/08* (2013.01); *B60W 20/40* (2013.01); *B60W 50/082* (2013.01); *B60W 2520/04* (2013.01); *B60W 2540/04* (2013.01); *B60Y 2200/92* (2013.01); *B60Y 2300/182* (2013.01); *Y10S 903/93* (2013.01)

(58) Field of Classification Search
CPC ..... B60W 2540/103; B60W 2550/142; B60W 2550/402; B60W 2710/024; B60W 2710/027; B60W 2710/244; B60W 10/28; B60W 2510/244; B60W 10/26; B60W 2510/105; B60W 2710/0677; G06F 2200/1637; G06F 11/1435; G06F 1/3287; G06F 3/03547; G06F 13/12

USPC ....... 701/1, 22, 101, 103, 70, 104, 110, 121, 701/21, 23
See application file for complete search history.

(56) References Cited

U.S. PATENT DOCUMENTS

| | | | |
|---|---|---|---|
| 7,091,839 B2 * | 8/2006 | Situ | B60K 37/02 340/438 |
| 9,327,589 B2 * | 5/2016 | Conlon | B60K 6/42 |
| 9,487,125 B2 * | 11/2016 | Geller | B60Q 1/30 |
| 9,677,530 B2 * | 6/2017 | Gibson | F02N 11/0837 |
| 2005/0200463 A1 * | 9/2005 | Situ | B60K 37/02 340/438 |
| 2009/0312895 A1 * | 12/2009 | Kim | B60K 6/365 701/22 |
| 2011/0307134 A1 * | 12/2011 | Yoshimi | B60K 6/48 701/22 |
| 2015/0158373 A1 * | 6/2015 | Conlon | B60K 6/42 701/22 |
| 2016/0229335 A1 * | 8/2016 | Geller | B60Q 1/30 |
| 2016/0280205 A1 * | 9/2016 | Nefcy | B60W 20/13 |
| 2018/0010491 A1 * | 1/2018 | Yamahata | B60K 6/365 |

FOREIGN PATENT DOCUMENTS

EP 2078652 7/2009
FR 2912980 8/2008

* cited by examiner

CONTROL SYSTEM, SWITCH AND CONTROL METHOD FOR A HYBRID ELECTRIC VEHICLE

CROSS-REFERENCE TO RELATED APPLICATIONS

This application claims foreign priority benefits under 35 U.S.C. § 119(a)-(d) to European patent application number EP 15166372.1, filed May 5, 2015, which is incorporated by reference in its entirety.

TECHNICAL FIELD

The present disclosure relates to a control system, switch and a method for a hybrid vehicle. In particular, the present disclosure relates to control of propulsion modes in a hybrid vehicle.

BACKGROUND

Hybrid electric vehicles (HEVs), electric vehicles (EVs) and Plug-In Hybrid Electric Vehicles (PHEVs) are becoming increasingly popular. In particular, hybrid and electric vehicles are becoming more attractive as battery performance is increasing while production costs are decreasing.

A major reason for the increasing interest in more environmental friendly vehicles is the growing concern about emission of greenhouse gases from fossil fuels.

In order to stimulate the use of hybrid and electric vehicles, many governments and regulatory agencies have introduced subsidies and benefits for such vehicles. The subsidy may be a reduced cost of purchase and benefits may include free parking, reduced tax, access to car pool lanes, access to dedicated low/no-emission zones etc.

In many cases, benefits are different for hybrid vehicles having a combustion engine compared to for pure electric vehicles with only electrical power sources. In a hybrid vehicle, the combustion engine can for example be activated when the electric power source is at low capacity, when additional power is required, or through manual selection. Accordingly it is not always possible to control when and where the combustion engine will operate. Therefore, hybrid vehicles are often denied the benefits offered to pure electric vehicles such as access to no-emission zones since it cannot be guaranteed that the combustion engine will not be active.

However, many hybrid vehicles have an electrical power source and energy storage capable of powering the vehicle for distances of at least 50 kilometers. Since a majority of trips in an urban environment typically are shorter than 50 km, this means that many hybrid vehicles will rarely use the combustion engine. Even so, hybrid vehicles will not be considered to be electric vehicles for the purpose of various benefits.

Accordingly, in view of the above, it is desirable to take advantage of the fact that many hybrid vehicles primarily operate using only an electric motor.

SUMMARY

In view of above-mentioned desired properties of a hybrid vehicle, it is an object of the present disclosure to provide means for controlling a hybrid vehicle to operate in an electric mode where only an electrical motor is used and where it is not possible to use combustion engine.

According to a first embodiment of the disclosure, it is therefore provided a control system for a hybrid vehicle, the vehicle being operable in a hybrid mode where a combustion engine and an electric motor can be used, and in an electric mode where only the electric motor can be used. The control system comprises a propulsion mode control module configured to control the vehicle to operate in one of the hybrid mode and the electric mode; and wherein the propulsion mode control module is further configured to verify that the vehicle has been in an off-state for a predetermined period of time before switching from the hybrid mode to the electric mode.

The electric mode should herein be understood as a mode where only the electrical motor can be used to power the vehicle. The electrical motor may for example be powered by a battery. In other words, when the vehicle is in the electric mode, the combustion engine is prevented from starting under any circumstances. This means that the combustion engine can not be used for functions such as heating and air-conditioning, charging of the 12V battery, powering a vacuum pump. In comparison, when the vehicle is in the hybrid mode, the electric motor can be used primarily but with the option of engaging the combustion engine when additional power is required or when the energy storage powering the electric motor is at low capacity.

The present disclosure is based on the realization that a hybrid vehicle can be controlled to be in an electric mode by forcing the vehicle to be in an off-state for a predetermined period of time before entering the electric mode. Thereby, it is possible to control if the vehicle is in the electric mode during a traffic control since the driver of the vehicle cannot immediately switch between hybrid mode and electric mode. It can thus be definitely verified that the vehicle is in the electric mode, allowing the vehicle to take advantage of the same benefits as a pure electric vehicle without a combustion engine. This would provide several advantages, both from the environmental aspect where more hybrid vehicle would be operated in an electric-only manner as well as from a user perspective due to the access to benefits previously reserved for pure electric vehicles.

According to one embodiment of the disclosure, the predetermined time may be at least 30 seconds. The predetermined time may be sufficiently long so that a vehicle can be pulled over and/or be controlled in a traffic control without the driver of the vehicle having time to switch to the electric mode before the vehicle has been controlled. Thereby, it is possible for authorities to verify that the hybrid vehicle is in compliance with regulations dictating that only electric propulsion can be used. The predetermined time can be set based on the specific requirements for a certain vehicle and for a certain region or set of regulations.

In one embodiment of the disclosure, the control system may further comprise a visual indicator visible from an outside of the vehicle indicating when the vehicle is in the electric mode. By means of a visual indicator, it can be verified that the vehicle is in the electric mode without anyone entering the vehicle, and also without stopping the vehicle. Such a control and verification routine could also be done automatically, for example using cameras located in areas where only electric vehicles are allowed.

Furthermore, the visual indicator may for example comprise a light source such as one or more light emitting diodes (LEDs). LEDs could for example indicate that the vehicle is in electric mode by providing a green light. The use and configuration of a visual indicator could also be controlled by regulatory agencies such that all vehicles having the electric mode capability within a certain region or country use the same type of visual indicator.

According to a second embodiment of the disclosure, there is provided a switch arrangement in a hybrid vehicle configured to switch a propulsion mode of the vehicle between a hybrid mode where a combustion engine and an electric motor can be used, and an electric mode where only the electric motor can be used; wherein the switch arrangement comprises a switch which is maneuverable to switch from the hybrid mode to the electric mode only when the vehicle has been in an off-state for a predetermined time.

By means of the above switch arrangement, the hybrid vehicle is prevented from transitioning from the hybrid mode to the electric mode when the vehicle is running or immediately after the vehicles has stopped. Thereby, a driver must stop the vehicle and turn it off completely before being able to activate the electric mode. Accordingly, the switch arrangement ensures that it can be verified that the vehicle actually is in the electric mode is areas where this is required. The switch arrangement may advantageously be incorporated in the control system described above in relation to the first embodiment of the disclosure.

Many hybrid and plug-in hybrid vehicles already have a switch inside the vehicle for selecting between a hybrid mode and a mode where the use of the combustion engine is limited. However, in present hybrid vehicles, such a switch can typically be activated when the vehicle is running and the mode where the electric motor is prioritized does not exclude the use of the combustion engine. Thereby, the presently available switches do not include the functionality of the switch arrangement disclosed herein.

According to one embodiment of the disclosure, the switch may advantageously be arranged at location remote from an ignition lock of the vehicle, and the switch may require an ignition key for switching from the hybrid mode to the electric mode. Thereby, it can be ensured that the vehicle is in an off-state since the ignition key must be removed from the ignition to activate the electric mode. Moreover, it will take some time to remove the key and to access the switch, thereby ensuring that some time has passed between turning the vehicle off and changing from hybrid to electric mode. The ignition key may for example be an physical key, a key fob, or a wireless device used to activate the vehicle.

Furthermore, the switch may be arranged at a location which is not accessible from the inside of said vehicle so that the driver of the vehicle must leave the vehicle to activate the electric mode.

In one embodiment of the disclosure, the switch may advantageously be arranged so that a door of the vehicle must be in an open position to physically access the switch.

As an example, the switch may be arranged at a passenger or driver end of an instrument panel of the vehicle and only accessible when a front door is open. Thereby, the location of the switch can be the same as for a switch for activation and deactivation of a passenger airbag, and the user of the vehicle may thus be familiar with the positioning of the switch. Furthermore, a switch located at the side of the instrument panel may also require the ignition key for activating an electric mode, further ensuring that the vehicle is in an off-state when the electric mode is activated.

According to one embodiment of the disclosure, the switch may be configured so that it can only be operated when a wireless vehicle immobilizing device is placed adjacent to the switch. A vehicle immobilizing device prevents the vehicle from being operated unless the immobilizing device is placed at a location where it can communicate with an engine control unit of a vehicle. Likewise, the vehicle immobilizing device can be used to prevent the switch from being operated unless the device is placed adjacent to the switch. This would prevent the transition from hybrid mode to electric mode during operation of the vehicle, provided that the switch is located at a distance from the ignition of the vehicle. A vehicle immobilizing device may also be referred to as a key-fob, wireless key, smart key or remote key communicating wirelessly with control circuitry of the vehicle by means of radio signals.

Further effects and features of the second embodiment of the disclosure are largely analogous to those described above in connection with the first embodiment of the disclosure.

According to a third embodiment of the disclosure, there is provided a method for controlling a propulsion system in a vehicle, the vehicle being operable in a hybrid mode where a combustion engine and an electric motor can be used, and in an electric mode where only the electric motor can be used. The method comprises: when the vehicle operates in the hybrid mode, receiving a request to enter the electric mode; determining if the vehicle has been in an off-state for a predetermined amount of time; if the vehicle has been in an off-state for said predetermined amount of time, entering the electric mode; and if the vehicle has not been in an off-state for the predetermined amount of time, remaining in said hybrid mode.

In one embodiment of the disclosure, the request to enter the electric mode may be received from an operator of the vehicle. Furthermore, the request may be triggered by activation of a mechanical switch. The switch is advantageously configured so that it not physically possible to move the switch to electric mode until the vehicle has been in an off-state for the predetermined time.

According to one embodiment of the disclosure, the entering the electric mode may comprise disabling a fuel pump and/or an ignition system of the combustion engine. Thereby, the combustion engine is prevented from starting until the fuel pump and/or ignition system is enabled, which only occur when the hybrid mode is entered. Many other means of disabling the combustion engine are of course also possible as will be apparent to the skilled person.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

These and other features of the present disclosure will now be described in more detail, with reference to the appended drawings showing example embodiments of the disclosure, wherein.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In the present detailed description, various embodiments of the control system, switch and control method according to the present disclosure are described.

Figure 1:
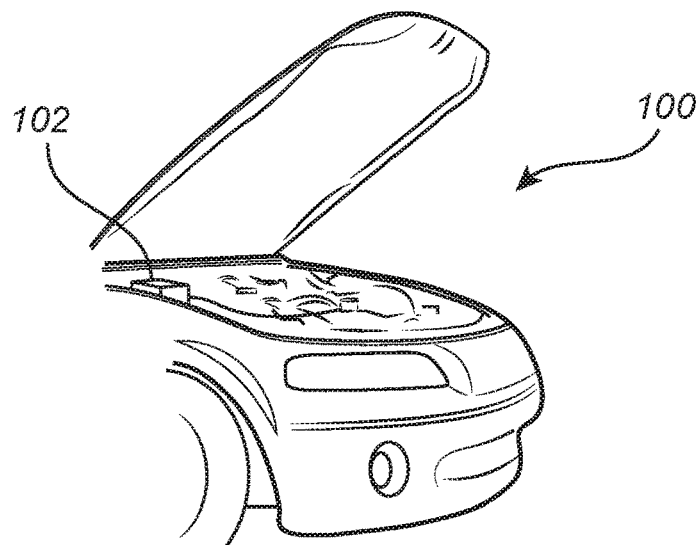
FIG. 1 schematically illustrates a hybrid vehicle according to an embodiment of the disclosure.

FIG. 1 schematically illustrates a hybrid vehicle 100. The hybrid vehicle 100 may for example be a Plug-In Hybrid Electric Vehicles (PHEV). The control system is described with reference to the flow chart in FIG. 2 outlining the general functional principles of the control system.

The vehicle 100 comprises a propulsion mode control module 102 configured to control the propulsion mode of the vehicle which is capable of operating in a hybrid mode and in an electric mode. The electric mode can also be referred to as a pure electric mode, or pure-EV mode. When the vehicle is in the electric mode, the propulsion control module is configured to prevent the combustion engine from starting under any conditions. This can for example be achieved by disabling the fuel pump or the ignition system of the combustion engine. The off-state is defined as a state when the complete vehicle is turned off, meaning that the combustion engine is completely turned off and the vehicle is not otherwise operational. The combustion engine may for example be inactive or disabled.

Figure 2:
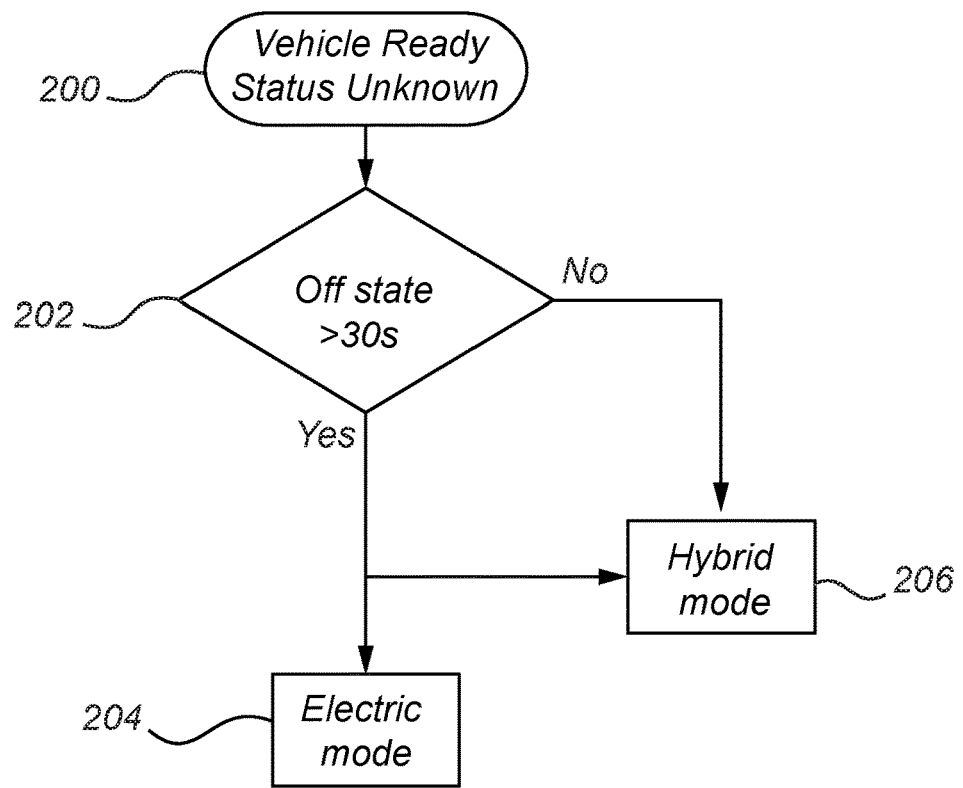
FIG. 2 is a flow chart outlining the general functionality of an embodiment of the disclosure.

With reference to the flow chart of FIG. 2, the starting point is an initial state 200 where the vehicle is ready to receive commands but the status is unknown, i.e. it is not known in which propulsion mode the vehicle is or if the vehicle is in an off-state. Next, the propulsion mode control module 102 determines 202 if the vehicle has been in an off-state for a predetermined time. If the vehicle has been in an off-state for less than the predetermined time, which herein is selected to be 30 s, it is not possible to switch from the hybrid mode 206 to the electric mode 204. If the vehicle already is in the electric mode, it is allowed to remain in that mode. If the vehicle has been in an off-state for more than 30 s, it is possible to switch freely between the electric mode 204 and the hybrid mode 206 and the operator of the vehicle can select either of the two modes. The selection can for example be made from inside of a vehicle using a control which is accessible to the driver of the vehicle. The propulsion control module 102 can be embodied in the form of generic or application specific hardware in combination with appropriate software capable of communicating with other control functions of the vehicle, for example via a CAN bus. Moreover, the propulsion control module 102 can be configured to control functions such as ignition and fuel supply of the combustion engine, or other functions of the combustion engine which can prevent the combustion engine from starting.

Furthermore, the system, propulsion control module 102, and/or switch arrangement described herein may be implemented in one or several arbitrary nodes arranged locally on-board the vehicle, which may be an electronic control unit (ECU) or any suitable electronic device. Those skilled in the art will also appreciate that the system, propulsion control module 102, and/or switch arrangement described herein may refer to a combination of analog and digital circuits, and/or one or more processors configured with software and/or firmware, e.g. stored in a memory, that when executed by the one or more processors perform the operations and/or functions described herein. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

It should be noted that it is possible to transition from the electric mode to the hybrid mode without delay if the operator of the vehicle wishes to select the hybrid mode.

Figure 3:
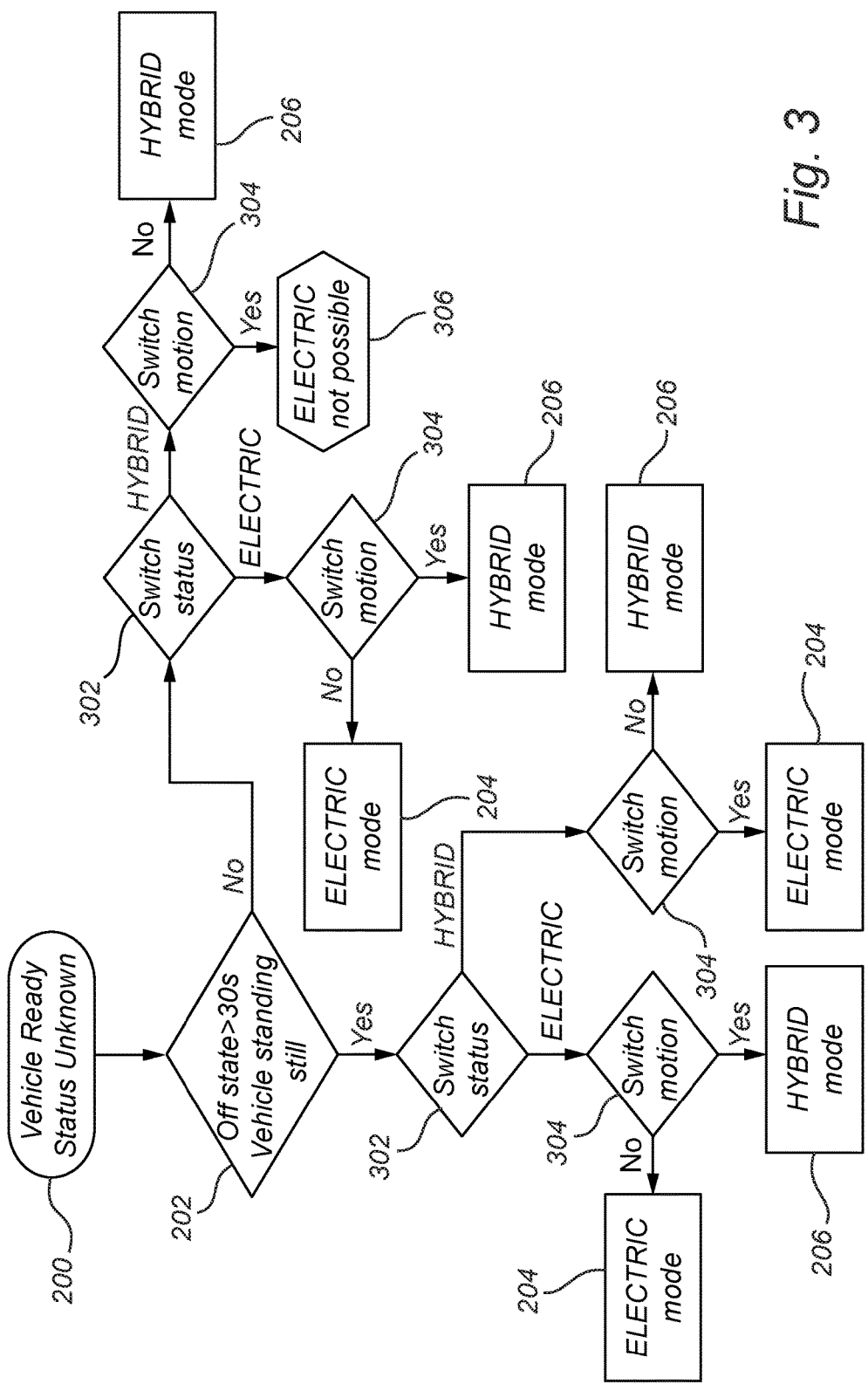
FIG. 3 is a flow chart outlining the functionality of an embodiment of the disclosure.

FIG. 3 is a flow chart illustrating the functionality of a control system according to an embodiment of the disclosure. In particular, the flow chart illustrates the possible ways in which the vehicle may be set to electric mode. The starting point is assumed to be a state 200 where the status of the vehicle is unknown. First, it is determined 202 if the vehicle has been in an off-state for at least 30 s. Next, the switch status 302 is controlled to determine if the switch is presently set to the electric mode 204 or the hybrid mode 206.

If it was determined that the vehicle has been in an off-state for more than 30 s, and if the switch is set to electric mode, the operator has the option to change the switch to hybrid mode 206 or to leave the switch in electric mode 204. The switch motion 304 indicates a movement of a mechanical switch. However, the general concept is equally applicable for other types of switches, such as a touch sensitive switch.

If it was determined 202 that the vehicle has been in an off-state for more than 30 s, and if the switch is set to hybrid mode, the operator has the option to change the switch to electric mode 204 or to leave the switch in the hybrid mode 206 setting.

If it was determined 202 that the vehicle has been in an off-state for less than 30 s, and if the switch is set to electric mode, the operator has the option to change the switch to hybrid mode 206 or to leave the switch in electric mode 204.

If it was determined 202 that the vehicle has been in an off-state for less than 30 s, and if the switch is set to hybrid mode, the operator has the option to leave the switch in hybrid mode 206, but it is not possible 306 to change the switch to electric mode.

Figure 4:
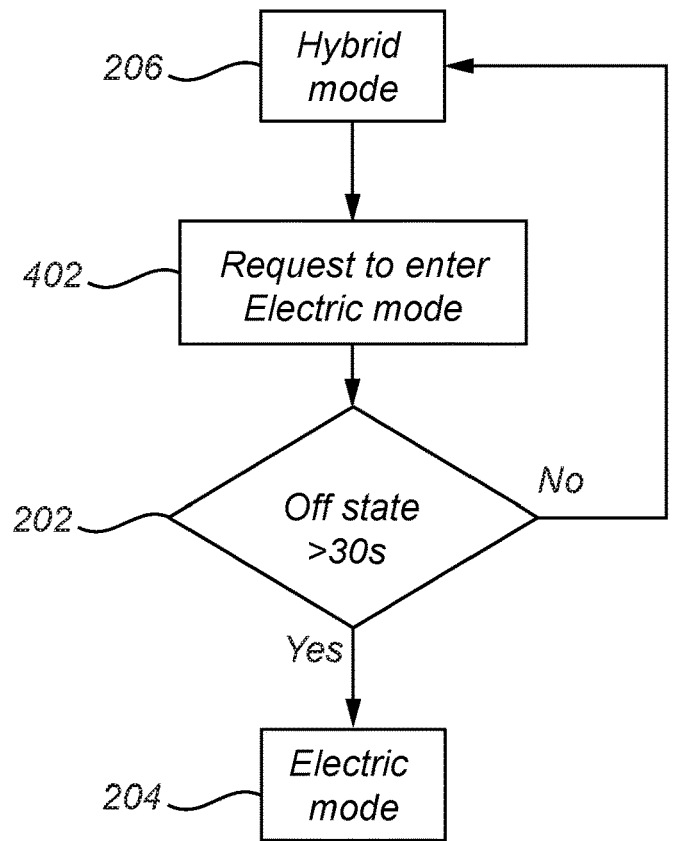
FIG. 4 is a flow chart outlining the general steps of a method according to an embodiment of the disclosure.

FIG. 4 is a flow chart further illustrating the principle where the vehicle is presently in the hybrid mode 206 and a request 402 to enter electric mode 204 is received by the control system of the vehicle. As the request is received, the control system determines if the vehicle has been in the off-state for a sufficient amount of time to determine if the vehicle is allowed to enter the electric mode 204.

Figure 5:
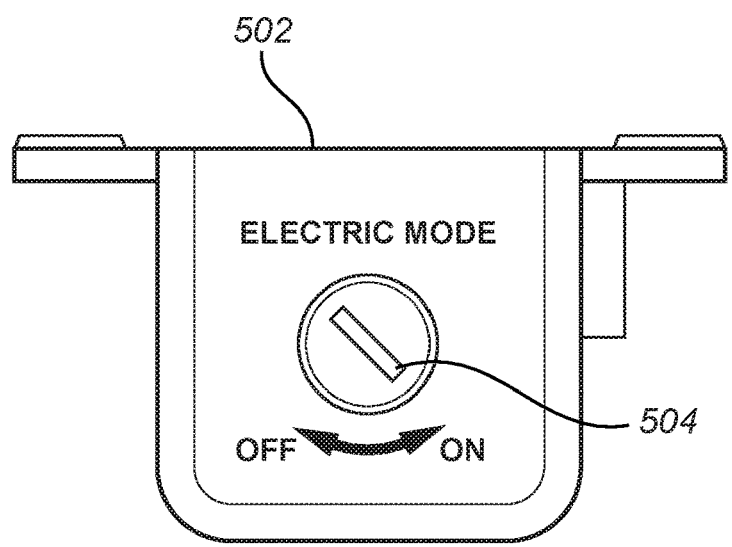
FIG. 5 is a schematic illustration of a switch according to an embodiment of the disclosure.

FIG. 5 illustrates a switch 502 according to an example embodiment of the disclosure. The switch comprises a keyhole 504 to be operated by a key, and the switch indicates that the electric mode can be toggled between on and off. The key may be a key which is also used for starting or enabling the vehicle, or it may be a separate key for this specific purpose.

Figure 6:
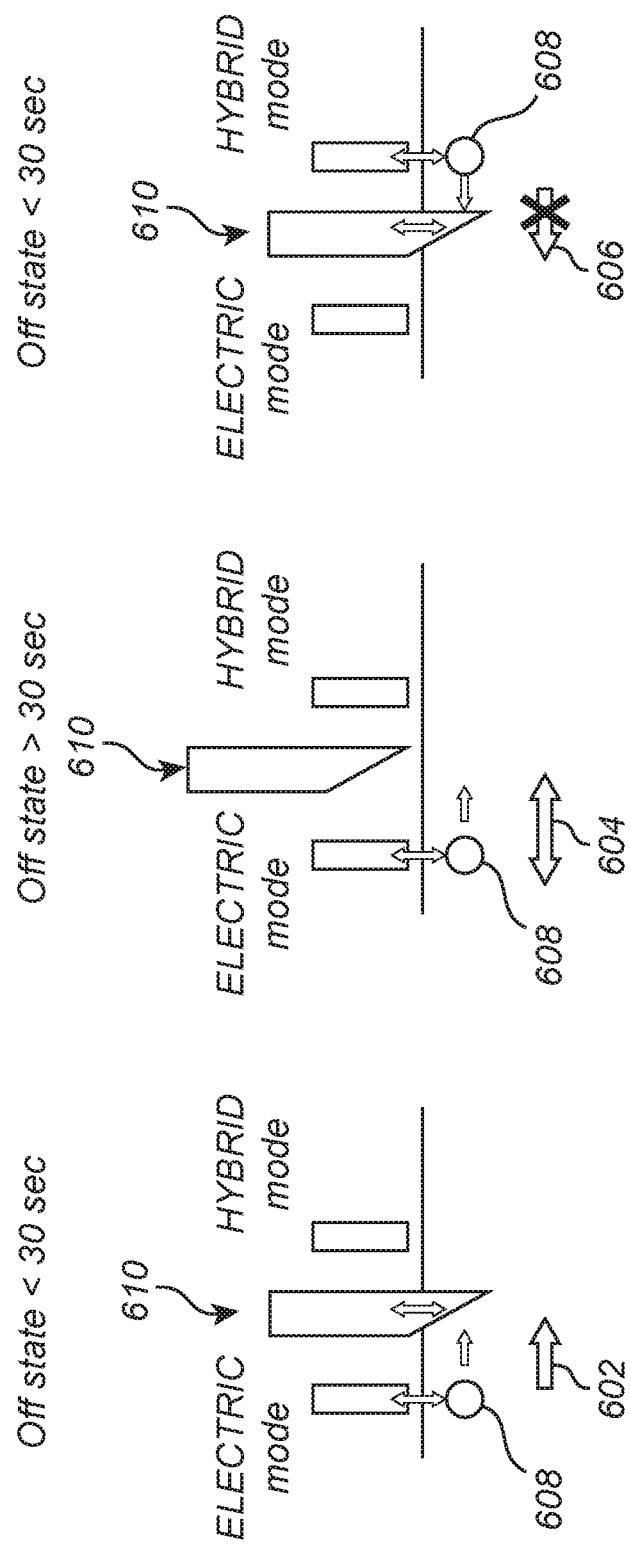
FIG. 6 is a schematic illustration of a switch according to an embodiment of the disclosure.

FIG. 6 schematically illustrates the functionality of a mechanical switch 608 according to an example embodiment of the disclosure. The actuator 610 is spring loaded and electromechanically controlled to be either in a lowered position or in a raised position depending on if the vehicle has been in an off-state for the required time. When the vehicle is not in an off-state, or has been in an off-state for less than 30 s, the actuator 610 is in the lowered position. If the switch 608 is set to electric mode, it is possible to move 602 the switch to hybrid mode by pushing up the spring loaded actuator 610. If the vehicle has not been in an off-state for 30 s, the actuator 610 is in a lowered position and the switch is physically prevented 606 from moving from the hybrid mode position to the electric mode position. If the vehicle has been in an off-state for more than 30 s, the actuator is in a raised position and the switch is free to move 604 between the electric and hybrid positions.

Figure 7:
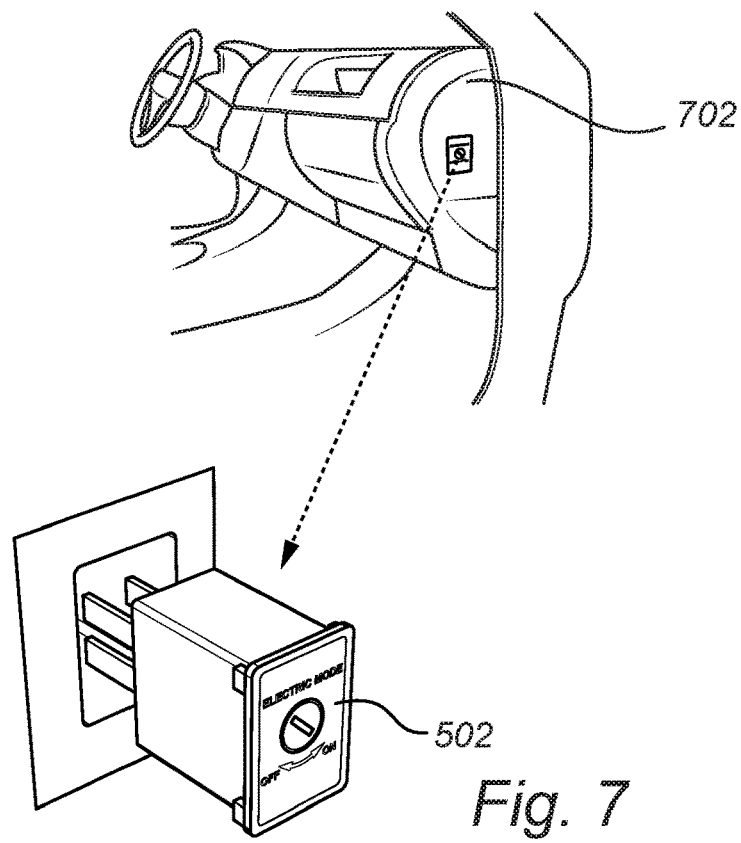
FIG. 7 is a schematic illustration of a vehicle comprising a switch according to an embodiment of the disclosure.

FIG. 7 schematically illustrates a switch 502 arranged in a vehicle. Here, the switch is arranged at the side of the instrument panel 602 of the vehicle, on the passenger side. Thereby, the switch 502 cannot be accessed from the driver seat of the vehicle, thus preventing a change from hybrid mode to electric mode when the vehicle is being operated. It should be understood that the illustrated location of the switch 502 is merely an example, and that the switch equally well may be located in other locations which are not accessible by an occupant of the vehicle. Such locations can for example be in the engine room or in the trunk of the vehicle.

Figure 8:
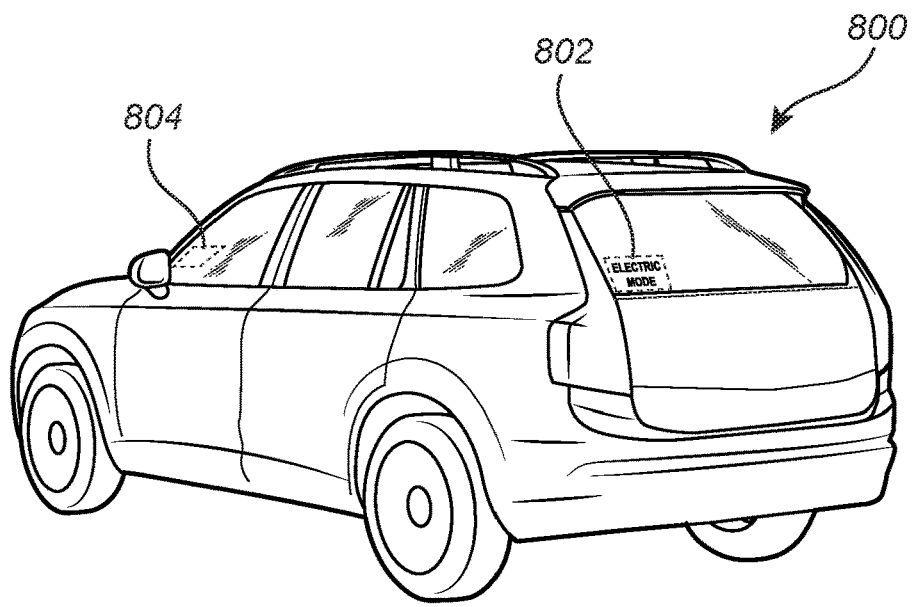
FIG. 8 is a vehicle according to an embodiment of the disclosure.

FIG. 8 illustrates a vehicle 800 equipped with any of the above described systems or switches. The vehicle 800 is further provided with visual indicators 802, 804, here illustrated in the form of a LED-based sign 702 in the rear window and a similar sign 704 in the front windshield. The indicator can for example be configured to emit green light when the vehicle is in the electric mode. Thereby, the indicators are visible from the outside of the vehicle and it can be verified that the vehicle is in the electric mode without stopping the vehicle.

The vehicle can also be provided with a sticker or the like to indicate that the vehicle has the capability to be operated in an electric mode.

Even though the disclosure has been described with reference to specific exemplifying embodiments thereof, many different alterations, modifications and the like will become apparent for those skilled in the art. Also, it should be noted that parts of the system and switch may be omitted, interchanged or arranged in various ways, the system and switch yet being able to perform the functionality of the present disclosure.

Additionally, variations to the disclosed embodiments can be understood and effected by the skilled person in practicing the claimed disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A control system for a hybrid vehicle, the vehicle being operable in a hybrid mode where a combustion engine and an electric motor can be used, and in an electric mode where only the electric motor can be used, the control system comprising:
   a propulsion mode control module configured to control the vehicle to operate in one of the hybrid mode and the electric mode;
   wherein the propulsion mode control module is further configured to verify that the vehicle has been in an off-state for a predetermined period of time before permitting switching from the hybrid mode to the electric mode.

2. The control system according to claim 1 wherein the predetermined time is at least 30 seconds.

3. The control system according to claim 1 further comprising a visual indicator visible from an outside of the vehicle indicating when the vehicle is in the electric mode.

4. The control system according to claim 3 wherein the visual indicator comprises a light source.

5. A switch arrangement for use in a hybrid vehicle configured to switch a propulsion mode of the vehicle between a hybrid mode where a combustion engine and an electric motor can be used, and an electric mode where only the electric motor can be used, the switch arrangement comprising a switch which is maneuverable to permit switching from the hybrid mode to the electric mode only when the vehicle has been in an off-state for a predetermined time.

6. The switch arrangement according to claim 5 wherein the switch is arranged at a location remote from an ignition lock of the vehicle, and wherein the switch requires an ignition key for switching from the hybrid mode to the electric mode.

7. The switch arrangement according to claim 5 wherein the switch is arranged at a location which is not accessible from the inside of the vehicle.

8. The switch arrangement according to claim 5 wherein the switch is arranged so that a door of the vehicle must be in an open position to physically access the switch.

9. The switch arrangement according to claim 8 wherein the switch is arranged at a passenger or driver end of an instrument panel of the vehicle and only accessible when a front door is open.

10. The switch arrangement according claim 5 wherein the switch is configured so that it can only be operated when a vehicle immobilizing device is placed adjacent to the switch.

11. A method for controlling a propulsion system in a vehicle, the vehicle being operable in a hybrid mode where a combustion engine and an electric motor can be used, and in an electric mode where only the electric motor can be used, the method comprising:
   when the vehicle operates in the hybrid mode, receiving a request to enter the electric mode;
   determining if the vehicle has been in an off-state for a predetermined amount of time;
   if the vehicle has been in an off-state for the predetermined amount of time, entering the electric mode; and
   if the vehicle has not been in an off-state for the predetermined amount of time, remaining in the hybrid mode.

12. The method according to claim 11 wherein the predetermined time is at least 30 seconds.

13. The method according to claim 11 wherein the request is received from an operator of the vehicle.

14. The method according to claim 11 wherein the request is triggered by activation of a mechanical switch.

15. The method according to claim 11 wherein entering the electric mode comprises disabling a fuel pump and/or an ignition system of the combustion engine.

* * * * *